(No Model.)　　　　　　　　　　　　　　　5 Sheets—Sheet 1.
G. T. JACOBS.
BRICK MACHINE.

No. 482,252.　　　　　　　　Patented Sept. 6, 1892.

Witnesses.　　　　　　　　　　　　　　Inventor:
　　　　　　　　　　　　　　　　George T. Jacobs.
　　　　　　　　　　　　　　　　By James L. Norris.
　　　　　　　　　　　　　　　　　　Atty.

(No Model.) 5 Sheets—Sheet 3.

G. T. JACOBS.
BRICK MACHINE.

No. 482,252. Patented Sept. 6, 1892.

Witnesses,
Robert Everett,
J. A. Rutherford

Inventor,
George T. Jacobs,
By James L. Norris,
Atty.

(No Model.) 5 Sheets—Sheet 4.

G. T. JACOBS.
BRICK MACHINE.

No. 482,252. Patented Sept. 6, 1892.

Witnesses.
Robert Garrett
J. A. Rutherford

Inventor.
George T. Jacobs.
By James L. Norris.
Atty.

(No Model.)  5 Sheets—Sheet 5.

G. T. JACOBS.
BRICK MACHINE.

No. 482,252.  Patented Sept. 6, 1892.

Witnesses:
Robert Ermitt
J. A. Rutherford

Inventor:
George T. Jacobs.
By James L. Norris
Atty.

UNITED STATES PATENT OFFICE.

GEORGE T. JACOBS, OF WASHINGTON, DISTRICT OF COLUMBIA.

BRICK-MACHINE.

SPECIFICATION forming part of Letters Patent No. 482,252, dated September 6, 1892.

Application filed October 29, 1891. Serial No. 410,234. (No model.)

*To all whom it may concern:*

Be it known that I, GEORGE T. JACOBS, a citizen of the United States, residing at Washington, in the District of Columbia, have invented new and useful Improvements in Brick-Machines, of which the following is a specification.

This invention relates to an improved brick-machine composing mechanisms for pressing and subsequently re-pressing clay or other suitable material in a series of traveling molds that are pivotally connected in an endless chain or belt and the combination therewith of devices for preparing and feeding the material and means for ejecting the pressed and re-pressed bricks from the molds and conveying them away from the machine.

The invention consists in certain features of construction and in novel combinations of devices in a machine for making bricks, tiles, and building or paving blocks, as hereinafter more fully set forth, whereby such articles can be rapidly produced in a great variety of shapes and styles, either simultaneously or at different times, as may be required.

Figure 1:
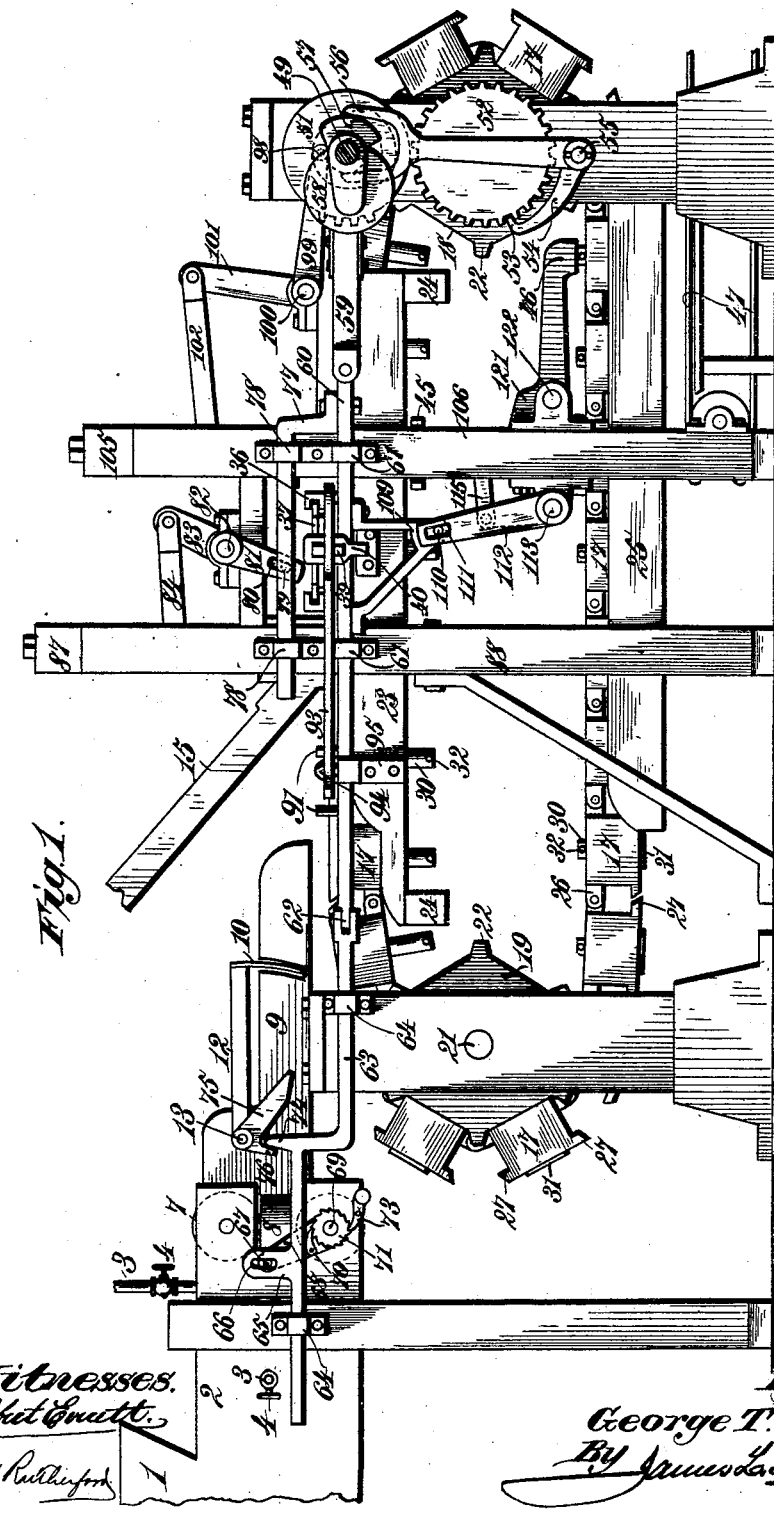
Figure 2:
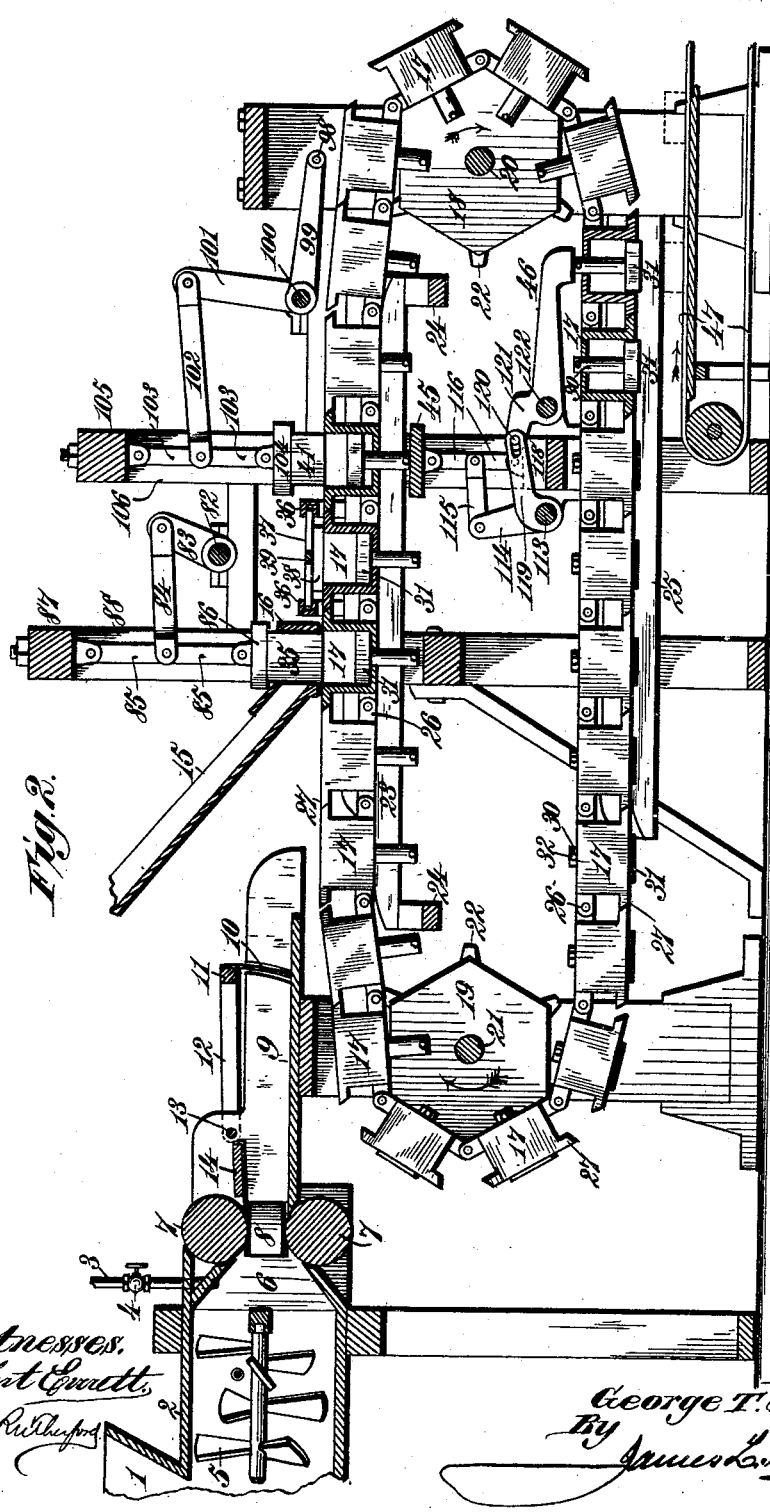
Figure 3:
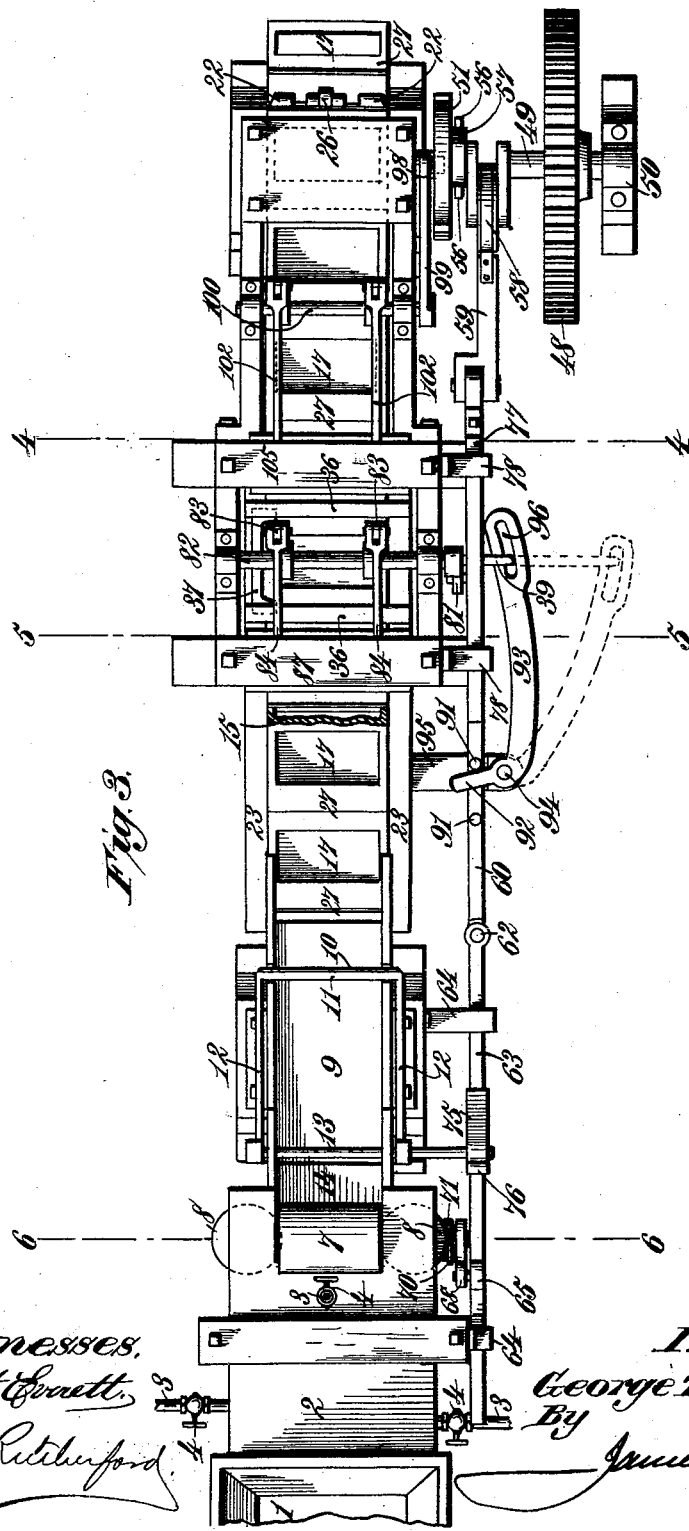
Figure 4:
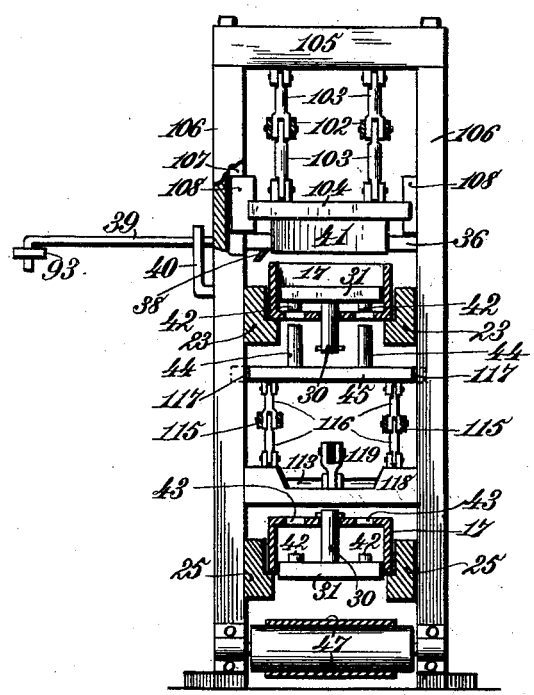
Figure 5:
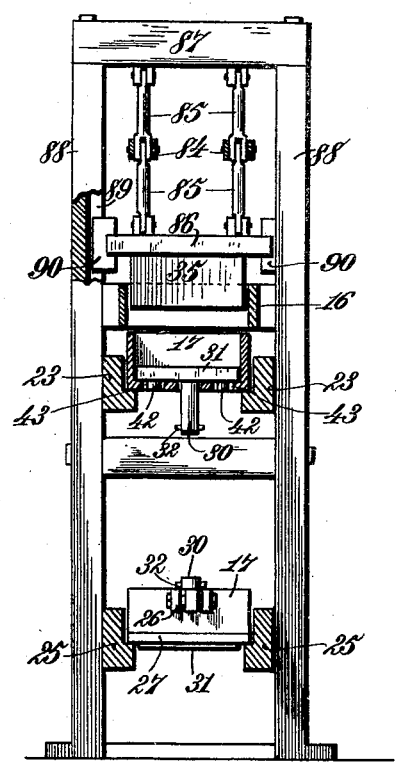
Figure 6:
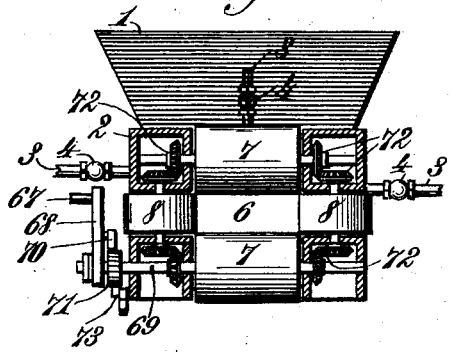
Figure 7:
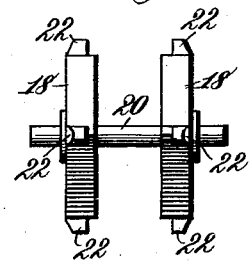
Figure 8:
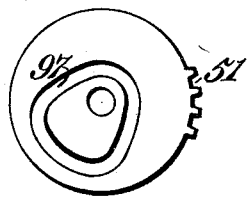
Figure 9:
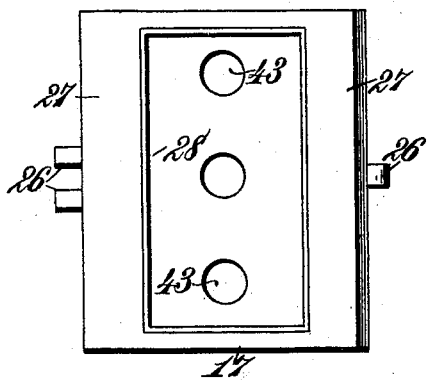
Figure 10:
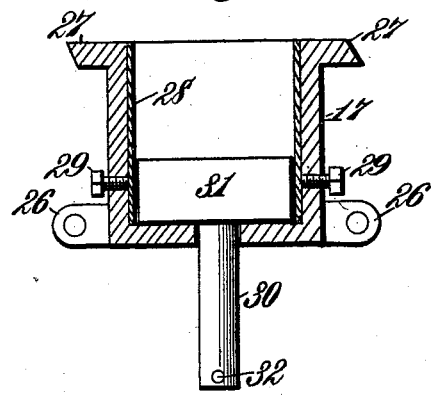
Figures 11, 12, 14:
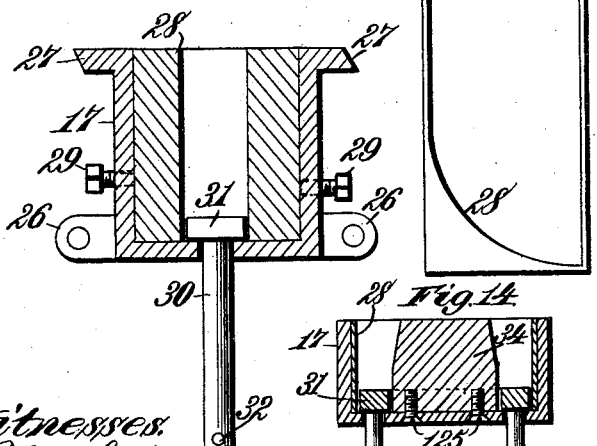
Figure 13:
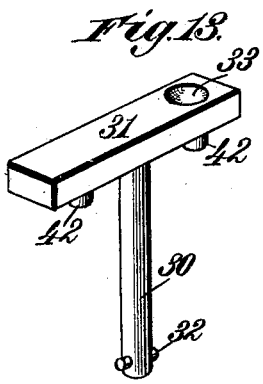

In the annexed drawings, illustrating the invention, Figure 1 is a side elevation of my improved brick-machine. Fig. 2 is an elevation, partly in longitudinal section. Fig. 3 is a plan. Fig. 4 is a vertical transverse section on the line 4 4 of Fig. 3. Fig. 5 is a similar section on the line 5 5 of Fig. 3. Fig. 6 is a detail sectional view on the line 6 6 of Fig. 3. Fig. 7 is an edge view of a pair of hexagon-shaped wheels for actuating an endless series of pivotally-connected molds. Fig. 8 is a view of a mutilated cam-gear. Fig. 9 is a plan of a mold. Fig. 10 is a vertical transverse section of the same. Fig. 11 is a vertical transverse section of a mold and its lining arranged for use with a narrow press-block for molding bricks, tiles, and building or paving blocks on edge. Fig. 12 is a plan of a form of mold-lining for use in making bricks with a curved face. Fig. 13 is a perspective of a press-block. Fig. 14 is a vertical section of a mold and press-block for making hollow bricks.

Referring to Figs. 1, 2, and 3 of the drawings, the numeral 1 designates a hopper through which clay may be fed into a tempering chamber or box 2, that may be supplied with steam through pipes 3, entering at suitable points and provided with hand-valves 4. Within the tempering-box 2 is a rotary stirrer 5, having its blades set in position to cut and mix the contents of the box and feed the tempered clay forward and through a contracted rectangular opening 6 at the exit end of said box. At this point the tempered clay is received by a set of feed-rollers, Figs. 1, 2, 3, and 6, comprising upper and lower horizontal rollers 7 and lateral vertically-arranged rollers 8, inclosing an oblong space that corresponds with the rectangular exit-opening 6 of the tempering-box. In passing through the opening 6 and between the feed-rollers 7 and 8 the clay is formed into a strip or bar, that is intermittingly fed by the action of said rollers along a trough 9, which conducts the strip of clay beneath an intermittingly-operated vertically-movable knife 10, that cuts the strip or bar into rectangular blocks of suitable size for the molds. The knife 10 is secured to a cross bar or head 11, carried by a pair of oscillatory arms 12, that are attached to a rock-shaft 13 at the forward edge of a horizontal guide-board 14, arranged across the trough 9 in front of the upper horizontal feed-roller 7 to prevent the strip of clay from being carried upward as it passes out from between the feed-rollers. The feed-rollers 7 8 and knife 10 are actuated intermittingly by means of mechanism hereinafter described.

When the machine is to be used for making bricks from untempered clay, the above-described devices need not be employed and may, if desired, be detached from connection with the main frame of the machine.

For use in making bricks from untempered clay an inclined chute 15 is provided, that conducts the clay into a mold through a box 16, Fig. 2, beneath which the mold is temporarily at rest. Whether tempered or not, the clay from the trough 9 or chute 15 is received in one of a series of traveling molds 17, that are coupled closely together in the form of a flexible endless chain or belt, as shown in Figs. 1 and 2. This endless chain of molds is supported at each end by a pair of hexagonal or polygonal wheels 18 and 19, Figs. 2 and 7, on shafts 20 and 21, mounted in the machine-frame. On the angles of these polygonal wheels 18 and 19 are lugs 22, that serve to settle the molds 17 onto their seats on the rims of said wheels and prevent any slipping of the molds in changing positions during the operation of the machine. Between the wheels 18 and 19 and slightly above the level of their uppermost faces are horizontal ways or guide-rails 23, Figs. 2, 4, and 5, on which a number of the uppermost molds 17 are supported in upright position while the clay is being fed therein and pressed and re-pressed into bricks. These upper guide-rails 23 may be supported by means of cross-bars 24, Figs. 1 and 2, or in any other convenient manner. In the lower part of the machine-frame are other horizontal guide-rails 25, over which the empty and inverted molds travel after discharging the bricks.

The molds 17 are made of metal and have the form of oblong rectangular boxes. On their opposite sides, at the bottom, are perforated coupling-lugs 26, by which the molds are pivotally connected in the form of an endless flexible chain, and on the upper side edges of said molds are broad flanges 27, that are beveled in reverse directions, as shown in Figs. 1, 2, 10, and 11, to form close easy-fitting joints with the correspondingly-beveled flanges of adjacent molds. These flanges 27 serve as guards to prevent the passage of dirt into the spaces between the molds, and, together with the guide-rails 23 and 25, they assist in imparting the necessary stiffness to the chain of molds to keep them steady and in line. Each mold is preferably provided with a steel lining 28, Figs. 9, 10, 11, 12, and 14, which may be of any desired form and thickness to vary the shape and size of the bricks, as may be required. To prevent the lining 28 from being forced out when the brick is ejected, the lining may be secured by binding-screws 29, as shown in Fig. 10. In the bottom of each mold-box 17 is a perforation for passage of the stem 30 of a movable press-block 31, that forms a false bottom for the mold and is prevented from falling out when the mold is inverted by means of a stop-pin or shoulders 32, carried by the end of the press-block stem. The press-block or movable false mold-bottom 31 is preferably made of hardened steel and will have a size and form corresponding with the dimensions and contour of the interior of the mold. For making flat rectangular bricks the press-block 31 and the interior of the mold 17 will be rectangular, as shown in Figs. 9 and 10. If the bricks are to have curved faces, the mold-lining 28 and press-block or false mold-bottom 31 will be of corresponding form.

Fig. 12 shows a mold-lining having an inner contour suitable for forming bricks with curved faces, and it is obvious that by suitable modifications of the mold-linings bricks of any desired curvatures or angles can be produced. If it is desired to press or mold the bricks edgewise, the long sides of the mold-lining 28 will be made of increased thickness, and the press-block 31 will be correspondingly narrow, as shown in Fig. 11. Should it be desired to ornament the exposed face of the brick with moldings in high or low relief, the necessary projections or recesses 33 may be provided on the acting face of the press-block 31, as shown in Fig. 13. For making hollow bricks a removable core 34, Fig. 14, can be secured to the central portion of the mold-bottom and surrounded by a slotted or recessed press-block. By thus providing the molds with removable and interchangeable linings and press-blocks or false bottoms bricks can be produced in a great variety of styles without changing or detaching the molds.

The endless chain of pivotally-connected molds 17 is moved intermittingly by mechanism hereinafter described. The consecutive uppermost molds travel horizontally and in upright position on the upper guide-rails 23, Fig. 2, and while in this position they are successively supplied with clay from the trough 9 or the chute 15 and open-bottomed box 16, as hereinbefore explained. While a mold is at rest on the upper guide-rails 23 and directly beneath the open-bottomed box 16 a vertically-movable depending plunger 35, Figs. 2 and 5, is caused to descend and press the clay in the said mold. By this action of the plunger 35, however, the clay is only partially pressed, as the press-block 31 remains for the time at rest in the bottom of the mold. At the next movement of the machine the mold-boxes 17 are carried forward one step and the plunger 35 is raised in position to repeat its operation in pressing the clay in the succeeding mold. In front of the box 16 are parallel transversely-arranged guide-rails 36, the inner faces of which are longitudinally grooved to provide guideways for a sliding cross-head 37, that carries an inclined knife or scraper 38 for removing any surplus of clay from the mold in which the block of clay has been partially pressed, as just described. To the cross-head 37 is attached a rod 39, that is extended laterally through a guide 40 to connect with mechanism from which the knife or scraper 38 is actuated, as presently explained. When the plunger 35 descends to press the clay in the mold beneath the box 16, the knife or scraper 38 is by the same movement of the machine caused to pass over the top of the preceding mold and remove any clay that may adhere to the edges thereof or any surplus that may result from swelling of the partially-pressed block of clay in the mold. The intermitting or step-by-step movement of the chain of molds carries a filled mold beneath a vertically-movable depending plunger 41, that is supported in front of the transversely-arranged guide-rails 36 and which when lowered serves as a top or cover for the mold while the brick or clay block in the mold is being re-pressed by the action of the vertically-movable press-block 31 forcing the clay upward against said plunger. On the under side of each press-block 31 are studs 42, Figs. 4, 5, and 13, that are adapted to enter openings 43 in the bottom of the mold when the press-block is resting on the mold-bottom. The studs 42 are acted on by vertically-projecting plungers 44, carried by a vertically-movable cross-head 45, Figs. 2 and 4, which forms part of the re-pressing mechanism and is actuated in the manner hereinafter described. It is obvious that the ascent of the cross-head 45 and attached plungers 44, bearing on the studs 42, will raise the press-block 31 and cause the already partially-pressed clay contained in the mold to be re-pressed and compacted between said press-block 31 and the lowered plunger 41, that forms the top or cover of the mold. By the intermittent movement of the molds they are carried forward along the upper longitudinally-arranged guide-rails 23, and thence onto the actuating hexagon-shaped wheels 18, by the rotation of which they are caused to gradually assume an inverted position. The bricks having been pressed and re-pressed in the molds will adhere to the walls thereof with sufficient tenacity to prevent them from falling out as the molds are carried around by the polygonal wheels. From the wheels 18 the inverted molds pass horizontally onto the lower longitudinally-arranged guide-rails 25, and while supported thereon the bricks are successively ejected by pressure from a hammer or ejector 46, Figs. 1, 2, and 4, bearing against the end of the now upwardly-projecting stem 30 of a press-block 31, as each mold comes into position. The bricks thus forced out of the molds by the joint action of the ejector 46 and inverted press-blocks 31 are received on a conveyer-belt 47, Figs. 1 and 2, or other suitable carriage, by which they are conducted away from the machine. Meantime the empty and inverted molds 17 are moved rearward step by step along the lower guide-rails 25, their false bottoms or press-blocks 31 being prevented from falling out by reason of the pins or stop-lugs 32 on the stems 30 of said blocks. By the intermitting rotation of the hexagon or polygonal shaped wheels 19 the molds are carried successively upward and caused to gradually resume an upright position on the upper longitudinal guide-rails 23, while the blocks 31 again drop by gravity to the bottoms of the said molds. Each mold now again receives clay from the trough 9 or the chute 15, as the case may be, and the operations of pressing, re-pressing, and ejecting the bricks are continuously repeated.

The machine is actuated by power from any convenient source applied to a spur-gear 48, Fig. 3, on a crank-shaft 49, that is journaled in suitable bearings in the machine-frame and in a standard 50, adjacent to one end of said frame. On the shaft 49 is a mutilated gear or partially-toothed disk 51, that is arranged to mesh at intervals with a spur-gear 52 on the shaft 20 of the hexagon mold-actuating wheels 18, and thereby impart an intermitting movement to the series of molds. To prevent the gear 52 from slipping when it comes to rest and to stop it promptly at the point where the mutilated gear 51 passes out of mesh, a locking-pawl 53, Fig. 1, is arranged to intermittingly engage the teeth of said gear 52, so as to lock and release it alternately at proper periods. The pawl 53 is on an arm 54, that is pivoted on a stud 55, and said arm 54 is connected with a lever 56, having an upper bifurcated or slotted end that embraces a cam 57 on the shaft 49, by which the pawl is actuated. By thus alternately locking and releasing the gear 52 the molds are held steady while at rest, and the rotation of the hexagon wheels is caused to commence and cease at such exact times as to carry the several molds to their proper positions with relation to the other parts of the brick-making mechanism. The crank-shaft 49 carries an eccentric 58, Figs. 1 and 3, having an eccentric-rod 59, pivotally connected with the forward end of a horizontally-arranged and longitudinally-reciprocating traverse-bar 60, that is supported in guides 61 at one side of the machine. To the rear end of the main traverse-bar 60 is connected by means of a joint 62 a detachable bar or extension 63, supported horizontally in guides 64 at suitable points. The supplemental bar or extension 63 may have its rear portion extended upward, as shown in Fig. 1, and provided with a lug 65, having a vertical slot 66 therein. In this slot 66 is engaged a laterally-projecting pin or stud 67 on the upper end of an arm 68, the lower end of which is loosely mounted on the projecting shaft 69 of the lower feed-roller 7, as shown in Figs. 1 and 6. The arm 68 carries a pawl 70, engaged with a ratchet-wheel 71, secured to the lower roller-shaft. As the shafts of the two horizontal feed-rollers 7 and two vertical feed-rollers 8 are connected by miter-gears 72 in the manner shown in Fig. 6, it is obvious that a forward movement of the traverse-bar extension 63, causing the arm 68 to oscillate forward on the lower roller-shaft 69, and thereby actuating the connected ratchet-gear, will rotate all the feed-rollers 7 and 8 in proper direction to feed a strip of clay from the tempering-box 2 and outward through the trough 9, as previously mentioned. On the back-stroke of the bar 63 and loosely-mounted oscillating arm 68 the ratchet-wheel 71 is held from backlash by a check-pawl 73, so that the feed-rollers cannot slip backward. The traverse-bar extension 63 carries a tappet 74, arranged to engage an inclined arm or cam 75 on the rock-shaft 13, and thereby raise the knife 10 into operative position on the forward stroke of the traverse-bar, while on the back-stroke of said bar the tappet 74 strikes against a stop or lug 76 at the rear end of said cam or arm 75, and thus gives an impulse to the rock-shaft 13, by which the knife 10, aided by gravity, is made to descend with sufficient force to sever a "glut" or block of clay from the rectangular strip that rests in the trough.

As the knife 10 is repeatedly raised and the clay strip intermittingly fed forward the severed blocks of clay are successively pushed from the exit end of the trough 9 and received in the molds 17, as already described. If it is desired to dispense with the tempering-box 2, trough 9, and their accompaniments, the traverse-bar extension 63 will be disconnected at the joint 62, and the molds will then be supplied with untempered clay through the inclined chute 15, as before mentioned.

To the main portion of the traverse-bar 60 is secured an upward-projecting and horizontally-extended arm 77, that reciprocates in guides 78 on the machine-frame. The arm 77 is provided with a pin or stud 79, Fig. 1, engaged in a slot 80, formed in the end of an arm 81, fixed to a rock-shaft 82, that is supported in suitable bearings between the frames in which the plungers 35 and 41 operate. The rock-shaft 82 carries rigid arms 83, which are connected by levers 84 with the toggles 85, that raise and lower the plunger 35 in the first operation of pressing the clay in the mold. The plunger 35 is carried by a cross-head 86, Figs. 2 and 5, to which the lower ends of the toggles are attached, while their upper ends are secured to a cross-beam 87 of the uprights 88, in the inner sides of which are vertical guide-grooves 89 to receive guide-blocks 90 on the ends of the plunger cross-head.

On the traverse-bar 60 are two vertical pins, studs, or strikers 91, Figs. 1 and 3, between which is received the tail end 92 of a lever 93, which is pivoted at 94 on a laterally-projecting bracket 95 and has in its forward end a slot 96, Fig. 3, that engages the outer hooked end of the rod 39, Fig. 4, whereby the knife or scraper 38 is actuated by the forward and backward movements of the traverse-bar.

The gear 51 on the shaft 49 is provided in one face with a cam-groove 97, Fig. 8, to receive a pin or roller 98 on the end of an arm 99, secured to one end of a rock-shaft 100, Figs. 1, 2, and 3, mounted in suitable bearings near the forward end of the machine-frame. The rock-shaft 100 is provided with rigid arms 101, that are connected by levers 102 with the toggles 103, Figs. 2 and 4, which raise and lower the upper plunger 41 of the re-pressing mechanism. The lower ends of the toggles 103 are connected with a cross-head 104, to which the plunger 41 is secured, and the upper ends of the said toggles are supported by a cross-beam 105 of a pair of uprights 106, the inner faces of which are provided with vertical guide-grooves 107, Fig. 4, in which are received guide-blocks 108 on the ends of the plunger cross-head.

The lower vertically-projecting plungers 44 of the re-pressing mechanism are supported and carried by a cross-head 45, Figs. 2 and 4, as hereinbefore mentioned, and are actuated from the traverse-bar 60 by means of suitable connections. To the under side of the traverse-bar 60 is secured an arm or bracket 109, Fig. 1, carrying a pin or projection 110, that is engaged in a slot 111 in the upper end of an arm 112, secured rigidly on one end of a rock-shaft 113, journaled in suitable boxes or bearings near the lower part of the machine-frame. The rock-shaft 113 carries upward-projecting arms 114, Fig. 2, which connect by levers 115 with toggles 116, that actuate the cross-head 45, and thereby raise and lower the attached lower plungers 44 of the re-pressing mechanism. The ends of the sliding cross-head 45 are provided with guides 117, engaged in the guide-grooves of the uprights 106, and the toggles 116 have their upper ends connected with the under side of said cross-head and their lower ends attached to abutments at the ends of a rigid cross-beam 118, extended between the uprights.

On the central portion of the rock-shaft 113 is a rigidly-secured arm 119, Fig. 2, the forward-projecting end of which has a loose slot-and-pin connection 120 with the tail end 121 of the hammer or ejector 46, that is mounted on a shaft 122, supported in suitable bearings in front of the cross-beam 118 and uprights 106, as shown in Figs. 1 and 2. By the movements of this rock-shaft 113, actuated from the traverse-bar 60, the pivoted hammer 46 is thus alternately raised and lowered to come in contact with the stems 30 of the press-blocks 31, and thereby eject the pressed bricks from the inverted molds as they come into proper position.

When making hollow bricks by means of a mold having a core 34, Fig. 14, surrounded by a slotted false bottom or press-block 31, the stems 30, studs 42, and lower plungers 44 may be dispensed with and the slotted press-block 31 be provided with two stems 123, Fig. 14, connected by a cross-bar 124, against which the cross-head 45 will bear in the operation of re-pressing the brick and with which the ejector 46 will come in contact to discharge the brick from the inverted mold. The core 34 may be detachably secured in a mold 17 by means of screws 125 or other fastenings, so that by removing said core the mold may be used for making ordinary bricks.

By various modifications in the configuration of the mold-linings 28 and press-blocks 31 bricks, tiles, and building or paving blocks can be rapidly produced in a great variety of shapes and styles, and it is obvious that with a number of simultaneously-operated molds having differently-shaped linings and press-blocks several different kinds of work can be produced at the same time.

What I claim as my invention is—

1. In a brick or tile machine, the combination, with a series of pivotally-connected molds, of movable press-blocks located in and forming false bottoms for said molds and having on their under sides projections that extend through openings in the mold-bottoms, a depending plunger for pressing the material in the mold while the press-block in said mold is at rest, oppositely-arranged upper and lower plungers so constructed that while the upper plunger closes the top of a mold the lower ones move the press-block upward to re-press the mold contents, and means for actuating the plungers and for moving the molds forward when the plungers are withdrawn, substantially as described.

2. In a brick or tile machine, the combination, with a series of traveling molds and movable press-blocks located in and forming false bottoms for said molds and having on their under sides projections that extend through openings in the mold-bottoms, of a vertically-movable plunger located above the molds for pressing the material in a mold while its press-block is at rest, oppositely-arranged upper and lower plungers located above and below the molds in such a manner that while the upper plunger closes the top of a mold the lower ones move the press-block vertically to re-press the mold contents, an ejector for discharging the mold contents, and mechanism for actuating the molds, plungers, and ejector, substantially as described.

3. In a brick or tile machine, the combination, with a series of pivotally-connected traveling molds and separate plungers for pressing and re-pressing the mold contents, of a laterally-reciprocating scraper located intermediate the pressing and re-pressing plungers to remove any surplus of clay from the mold in which the clay has been partially pressed and mechanism for actuating the molds, plungers, and scraper, substantially as described.

4. In a brick or tile machine, the combination of a series of traveling molds having movable false bottoms or press-blocks, mechanism for feeding clay into said molds, a depending vertically-movable plunger for pressing the contents of the molds while their press-blocks are at rest, vertically-movable and oppositely-arranged upper and lower plungers for closing the top of a mold and moving its press-block upward to re-press the mold contents, and mechanism for moving said molds and plungers intermittingly, substantially as described.

5. In a brick or tile machine, the combination of a tempering-box having feed-rollers in its exit end, a trough to receive the strip of clay from between said rollers, a horizontal guide-board supported across the trough above and in front of the exit-space between the rollers to prevent the clay strip from being carried upward as it passes out from the rollers, and a knife for cutting the strip of clay into blocks, substantially as described.

6. In a brick or tile machine, the combination of a series of traveling molds having movable false bottoms or press-blocks located therein, mechanism for feeding clay into said molds, a depending plunger for pressing the contents of a mold while its press-block is at rest, oppositely-arranged upper and lower plungers for closing the top of a mold and actuating its press-block to re-press the mold contents, a laterally-movable scraper located intermediate the pressing and re-pressing plungers, an ejector for discharging the pressed and re-pressed contents of the molds, and mechanism for intermittingly moving the molds, plungers, scraper, and ejector, substantially as described.

7. In a brick or tile machine, the combination of a tempering-box provided with feed devices, a series of traveling molds, a trough intermediate said tempering-box and molds, a horizontal guide supported across the trough above and in front of the exit end of the tempering-box to hold the strip of clay down onto the trough, and a vertically-movable knife to cut the clay into blocks for the molds, substantially as described.

8. In a brick or tile machine, the combination of the tempering-box 2, the trough 9 for receiving a strip of tempered clay from said box, the intermediate horizontal and vertical feed-rollers 7 and 8, having their shafts provided with miter-gears 72, the ratchet-wheel 71 on the shaft of one of the horizontal feed-rollers, the arm 68, loosely mounted on said roller-shaft and provided with a pawl 70 and a pin 67, and the reciprocating bar 63, having a slotted lug engaged with said pin, whereby the feed-rolls are intermittingly actuated, substantially as described.

9. In a brick or tile machine, the combination of a series of traveling molds, a trough 9 for supporting a strip of clay, devices for feeding the clay along the trough toward the molds, a vertically-movable knife 10, arms 12, that carry said knife, a rock-shaft 13, to which said arms are secured, an inclined arm or cam 75, mounted on the rock-shaft and provided with a lug 76, and the reciprocating bar 63, having a tappet 74 engaged with said cam, whereby the knife 10 is actuated intermittingly, substantially as described.

10. In a brick or tile machine, the combination of a series of traveling molds 17, provided with movable false bottoms or press-blocks 31, the depending vertically-movable plunger 35, having a cross-head 86, provided at its ends with guides 90, the uprights 88, having vertical grooves 89 to receive said guides, the cross-beam 87, the toggles 85, the rock-shaft 82, having upward-projecting arms 83 and a downward-projecting arm 81, the levers 84, connecting the arms 83 and toggles 85, and the reciprocating arm or bar 77, having a loose connection with the rock-shaft arm 81, whereby the plunger 35 is actuated, substantially as described.

11. In a brick or tile machine, the combination, with a series of traveling molds 17, of a laterally-reciprocating knife or scraper 38, located above said molds, a cross-head 37, to which said knife is secured, the guide-rails 36 the rod 39, the pivoted lever 93, engaged with said rod and having a tail end 92, and the traverse-bar 60, provided with pins or strikers 91 to impinge on the tail end 92 of the lever 93, and thereby actuate the knife or scraper, substantially as described.

12. In a brick or tile machine, the combination, with a series of traveling molds 17, having movable bottoms or press-blocks 31 located therein, of the upper plunger 41, having a cross-head 104, provided at its ends with guides 108, the uprights 106, having vertical grooves 107 to receive said guides, the cross-beam 105, the toggles 103, the rock-shaft 100, having arms 101, the levers 102, connecting said arms and toggles, the rotary gear 51, provided with a cam-groove 97, the arm 99, mounted on the rock-shaft 100 and having a pin or roller engaged in said cam-groove, whereby the plunger 41 is intermittingly actuated to close the top of a mold, and mechanism for raising the press-block 31 in the mold when the top of said mold is closed, substantially as described.

13. In a brick or tile machine, the combination, with a series of traveling molds 17, having movable false bottoms or press-blocks 31 located therein and provided on their under sides with studs 42, that enter openings 43 in the mold-bottoms, of a vertically-movable cross-head 45, provided with vertically-projecting plungers 44 to bear on the studs 42 and force a press-block 31 upward in a mold, the uprights 106, having vertical grooves to receive guides on the ends of said cross-head, the cross-beam 118, the toggles 116, the rock-shaft 113, having arms 114, the levers 115, connecting said arms and toggles, the arm 112, mounted on the rock-shaft 113, the traverse-bar 60, provided with a bracket 109, having a loose connection with said rock-shaft arm, and an upper depending plunger 41 for closing the top of a mold when the press-block 31 located therein is actuated, substantially as described.

14. In a brick or tile machine, the combination, with a series of pivotally-connected traveling molds 17, having movable false bottoms or press-blocks 31, provided with stems 30, projecting through the mold-bottoms, of an ejector 46, adapted to be brought in contact with the stem of a press-block in an inverted mold to eject a brick therefrom, a shaft 122, on which said ejector is mounted, the rock-shaft 113, having an arm 119, loosely connected with the tail end of said ejector, and means for actuating said rock-shaft, substantially as described.

15. In a brick or tile machine, the combination of a series of pivotally-connected traveling molds 17, having vertically-movable false bottoms or press-blocks 31, provided with stems 30, that project through the mold-bottom, a pivotally-supported and intermittingly-actuated ejector 46, adapted to be brought in contact with the stem of a press-block in an inverted mold to eject a brick therefrom, and a conveyer 47 to receive and carry away the discharged bricks, substantially as described.

16. In a brick or tile machine, the combination, with a series of pivotally-connected traveling molds 17, of the polygonal wheels 18 and 19, on which the chain of molds is mounted, the shaft 20 of the wheels 18, the spur-gear 52 on said shaft, the shaft 49, having a mutilated gear 51, adapted to mesh at intervals with the spur-gear 52, and thereby actuate the wheels 18 and 19 and molds 17 intermittingly, the cam 57 on the shaft 49, the pivoted and bifurcated or slotted lever 56, engaged with and actuated by said cam, and the lever-arm 54, having a pawl 53, adapted to engage with and intermittingly lock and release the gear 52, substantially as described.

17. In a brick or tile machine, the combination of a series of pivotally-connected traveling molds 17, intermittingly-rotating polygonal wheels 18 and 19, on which the chain of molds is mounted, a depending vertically-movable plunger 35 for pressing the clay in an upright mold, oppositely-arranged upper and lower plungers 41 and 44 for re-pressing the clay in the upright molds, press-blocks 31, located in said molds and adapted to be acted on by the lower plungers 44 of the re-pressing mechanism, the rotary shaft 49, provided with cams or eccentrics, and connections from said cams or eccentrics to intermittingly actuate the pressing and re-pressing plungers, substantially as described.

In testimony whereof I have hereunto set my hand and affixed my seal in presence of two subscribing witnesses.

GEORGE T. JACOBS. [L. S.]

Witnesses:
J. A. RUTHERFORD,
D. G. STUART.